Aug. 30, 1960         F. R. FORREST         2,950,943
LUBRICATION DEVICE FOR ANTIFRICTION BEARINGS
Filed June 21, 1957
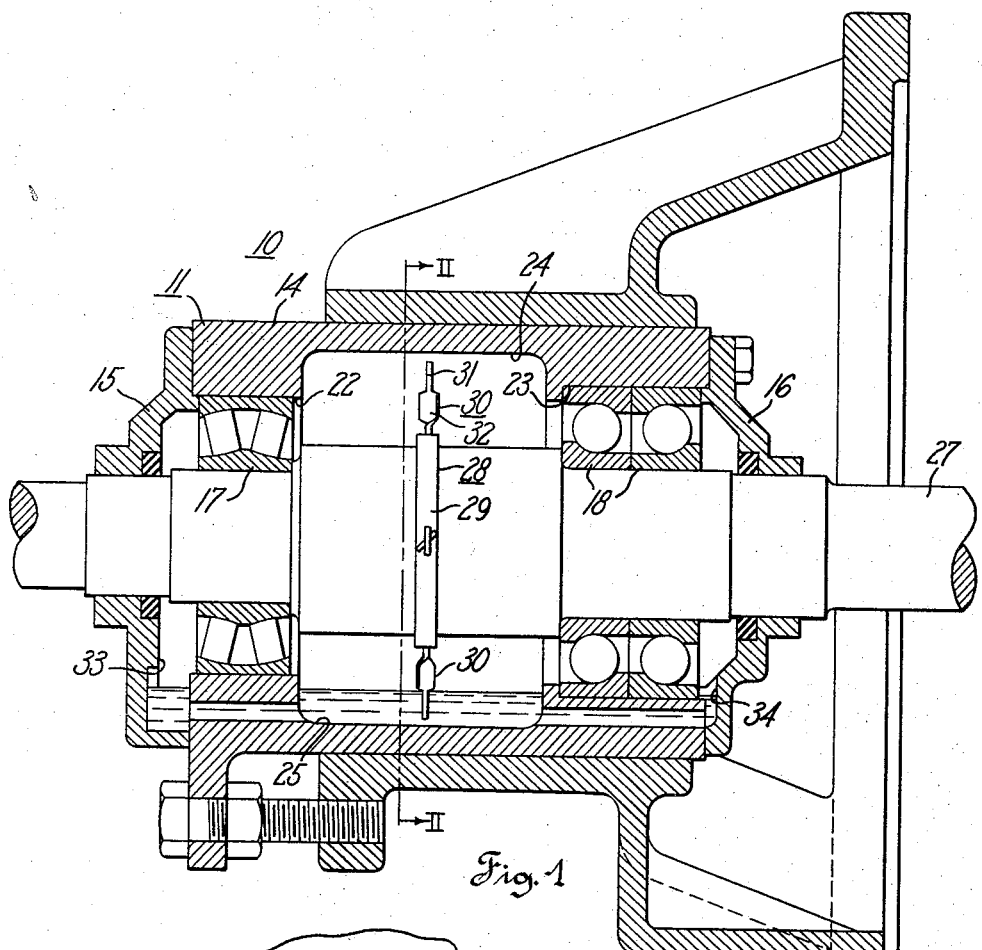
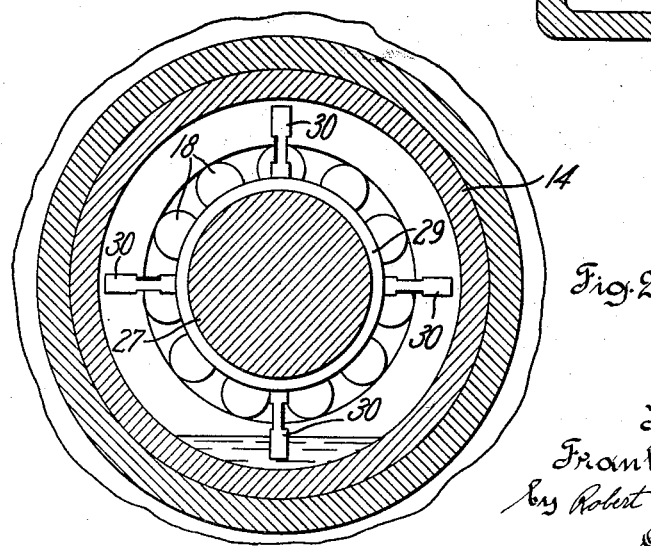
Inventor
Frank R. Forrest
by Robert B. Benson
Attorney

United States Patent Office 2,950,943
Patented Aug. 30, 1960

2,950,943

LUBRICATION DEVICE FOR ANTIFRICTION BEARINGS

Frank R. Forrest, Brookfield, Wis., assignor to Allis-Chalmers Manufacturing Company, Milwaukee, Wis.

Filed June 21, 1957, Ser. No. 667,181

5 Claims. (Cl. 308—187)

This invention relates generally to the lubrication of bearings. More specifically this invention relates to a slinger type device for lubricating antifriction bearings with oil.

One of the real problems in lubricating bearings is to devise a means for supplying just the right amount of lubrication to the bearings. Over lubrication of antifriction bearings, whether with grease or oil, causes extreme heating which results in excessive wear on the bearings. The more the bearings are over lubricated the hotter the bearings operate. It is believed that a very thin film of lubrication on the moving parts provides the best lubrication and the coolest operating bearings.

One well known system of lubricating antifriction bearings is the splasher or a slinger type lubrication device. The slinger type lubrication device includes an oil reservoir in the bearing housing and a slinger rotatably mounted on a shaft. The slinger as it rotates with the shaft dips into the oil reservoir and throws oil outwardly by centrifugal force into the bearing housing. This oil which is thrown outwardly by the slinger is used to lubricate the bearings. In such a device it is often necessary to provide suitable conduits for directing the lubricant to the surfaces to be lubricated. These structures are often complicated and result in an over lubrication of the bearings because the amount of oil thrown outward by the slinger and directed to the bearings is determined by the speed of the rotating shaft. Therefore the amount of lubricant directed to the bearings increases at high speeds and loads when for good lubrication and cooler operation the amount of lubrication should be at a minimum.

This invention overcomes the problems mentioned above by calling for a slinger type lubrication device in which the slinger churns the lubricant creating a lubricant mist within the bearing housing and then blows the mist to the bearings for lubrication. To accomplish this result, a portion of the slinger arms is made in the form of a fan blade so that upon rotation of the shaft the arms will cause a circulation of air within the lubricant chamber that will force the lubricant mist to flow to the bearings to be lubricated. Such an arrangement will insure that a minimum amount of lubricant will be directed to the bearing surfaces and will further prevent excess lubrication of the bearings because only the lubricant mist will be directed to the bearings. Furthermore, the lubricant device of this invention will improve the operation of the bearings by increasing the air flow around the bearings and hence increase the rate of cooling of the bearings.

Therefore it is the object of this invention to provide a new and improved lubrication device for antifriction bearings.

Another object of this invention is to provide a new and improved slinger-fan type lubrication device for antifriction bearings.

Fig. 1 is a cross section view of the bearing lubrication device; and

Fig. 2 is a cross section view taken along the line II—II of Fig. 1.

The lubrication device 10 of this invention is illustrated in Fig. 1 in connection with a bearing structure 11 adapted to be mounted on a centrifugal pump, not shown. The bearing structure 11 comprises a housing 14, a pair of end covers 15, 16, a roller bearing 17, and a ball bearing 18. The bearing housing 14 defines concentric axially spaced bearing seats 22, 23 for receiving the roller bearing 17 and the ball bearing 18, respectively. Intermediate these seats 22, 23 the housing defines an annular lubricant chamber 24 which extends radially beyond the bearing seats. The lower part of the lubricant chamber 24 which extends below the bearing seats 22, 23 forms a lubricant reservoir 25. Means are provided for supplying lubricant to the reservoir 25.

A shaft 27 is rotatably mounted in the bearings 17, 18. An oil slinger 28 is mounted on the shaft 27 for rotation therewith. The slinger comprises an annular collar 29 and a plurality of radially extending arms 30 arcuately spaced around the periphery of the collar. The slinger is positioned on the shaft intermediate the bearings 17, 18 within the lubricant chamber 24 of the bearing housing 14.

The arms 30 extend radially beyond the bearing seats 23, 22 so as to dip into the reservoir 25 upon rotation of the shaft. Some of the arms act as fans to circulate air within the chamber 24. A portion of the arms 30 between the collar 29 and the tips 31 that rotates out of the lubricant is twisted to form fan blades 32. The tips 31 of the arms 30 are aligned with the rotation of the shaft to reduce the resistance as the tip passes through the oil reservoir. The fan portions 32 of the arm 30 are formed so that they rotate out of the lubricant in the reservoir. If desired some of the fan portions 32 can be angled in one direction and others in an opposite direction to cause air circulation in two directions within the housing 14. Preferably alternate fan portions are bent in one direction and the other fan portions are bent in another direction.

As the shaft 27 and the slinger 28 rotate the tips 31 of the arms 30 extend into the lubricant reservoir 25. Particles of the lubricant cling to the tips 31 and are thrown outward by centrifugal force into the lubricant chamber 24. Some of the lubricant particles will become suspended in the air to create a mist of lubricant within the chamber. The lubricant particles that do not become suspended in air drop back into the reservoir 25. As the arms 30 rotate the fan portions 32 cause a circulation of air within the chamber. The circulation of air within the chamber carries the lubricant mist to the bearings 17, 18 for lubrication. The lubricant mist being circulated by the fan portions 32 assures that a controlled minimum amount of lubricant is directed to the bearings to be lubricated.

The amount of lubricant mist in the chamber can be controlled by varying the number of arms 30 and the size of the tips 31. The volume of air circulation and hence lubricant mist circulation within the housing 14 can be controlled by the angle of the fan portions 32 and by the number of arms 30 that have fan portions.

Since the lubricant is in suspension in the air and is blown toward the bearings only an adequate amount of lubricant will cling to the bearing surfaces. The remaining lubricant mist will be blown against the side walls of the chamber or past the bearings to the end covers 15, 16. The excess lubricant will then accumulate on the side walls of the chamber 24 and end covers 15, 16 and will be returned to the reservoir 24 directly or through the channels 33, 34 extending from the outboard side of the bearings 17, 18 to the lubricant chamber 24.

The rotating arms which act as fan blades to circulate the oil mist to the bearings have the added effect of increasing the circulation of air within the bearing housing thereby increasing the heat transfer from the movable parts of the bearings. Hence the bearings of this structure are not only properly lubricated but have the added advantage of increased cooling due to the increased circulation of air within the housing.

The slinger arms are flexibly or pivotably mounted on the collar 29. Preferably the arms are made of a thin flexible materials so that the slinger may be mounted on a shaft and then inserted into a one piece bearing housing to facilitate assembly of the unit. If the arms are flexible they can bend as the slinger is being moved past the bearing seats 22 and spring back into position within the lubricant chamber after the blades have passed the bearing seat 22. To facilitate the bending of the arms without breaking, the fan portions 32 are spaced a short distance from the collar 29. The broad side of the arm 30 adjacent the collar 29 is normal to the axis of the shaft so that it can easily bend as the shaft is being moved past the bearing seat 22 to position the slinger within the chamber 24. Furthermore, if the arms are made of a thin flexible material a portion of the arm may be easily twisted into the form of a fan blade. The use of flexible arms on the slinger makes it possible to make the bearing housing in a single piece and still mount the slinger within the housing. Such an arrangement is much simpler and more economical than making the housing in two separate pieces positioning the slinger in the housing and then bolting the housing together around the shaft.

Although but one embodiment of the invention has been illustrated and described, it will be apparent to those skilled in the art that various changes and modifications may be made herein without departing from the spirit of the invention and the scope of the appended claims.

What is claimed is:

1. A bearing lubrication device comprising a bearing housing, said housing having axially spaced bearings mounted therein and a lubricant reservoir intermediate said bearings, means for supplying lubricant to said reservoir, a shaft journaled in said bearings, and a slinger mounted on said shaft, said slinger having a plurality of arcuately spaced radially extending arms which dip into said reservoir upon rotation of said shaft, some of said arms being formed to circulate air in one direction, the other of said arms being formed to circulate air in the opposite direction, whereby upon rotation of said shaft said arms lift lubricant out of said reservoir to form a lubricant mist in said housing and blow the lubricant mist in opposite directions to lubricate said bearings.

2. A bearing lubrication device comprising a bearing housing, said housing having axially spaced bearing seats and a lubricant reservoir intermediate said bearing seats, antifriction bearings positioned in said bearing seats, a shaft journaled in said bearings, means for supplying lubricant to said reservoir, a slinger mounted on said shaft intermediate said bearings, said slinger having a plurality of flexible arcuately spaced radially extending arms, the tips of said arms being positioned to dip into said reservoir upon rotation of said shaft to create a lubricant mist in said housing, a portion of alternate said arms being twisted to form fan blades for circulating air in one direction, a portion of the other said arms being formed to circulate air in the opposite direction, whereby upon rotation of said shaft said arms lift lubricant out of said reservoir to form a lubricant mist and blow said lubricant mist in opposite directions to lubricate said bearings.

3. A bearing lubrication device comprising a bearing housing, said housing having axially spaced bearings mounted therein and a lubricant reservoir intermediate said bearings, means for supplying lubricant to said reservoir, a shaft journaled in said bearings, and a slinger mounted on said shaft, said slinger having a plurality of arcuately spaced radially extending arms flexibly connected to said shaft, said arms being positioned to dip into said reservoir upon rotation of said shaft, a portion of some of said arms being formed to circulate air in one direction, a portion of the other of said arms being formed to circulate air in the opposite direction, whereby upon rotation of said shaft said arms lift lubricant out of said reservoir to form a lubricant mist in said housing and blow the lubricant mist in opposite directions to lubricate said bearings.

4. A bearing lubrication device comprising a bearing housing, said housing having axially spaced bearings mounted therein and a lubricant reservoir intermediate said bearings, means for supplying lubricant to said reservoir, a shaft journaled in said bearings, and a slinger mounted on said shaft, said slinger having a plurality of arcuately spaced radially extending flexible arms which dip into said reservoir upon rotation of said shaft, a portion of some of said arms being positioned to rotate out of said lubricant and formed to circulate air in one direction, a portion of the other of said arms being positioned to rotate out of said lubricant and formed to circulate air in the opposite direction, whereby upon rotation of said shaft said arms lift lubricant out of said reservoir to form a lubricant mist in said housing and blow the lubricant mist in opposite directions to lubricate said bearings.

5. A bearing lubrication device comprising a bearing housing, said housing having axially spaced bearings mounted therein and a lubricant reservoir intermediate said bearings, means for supplying lubricant to said reservoir, a shaft journaled in said bearings, a collar mounted on said shaft, a plurality of arcuately spaced radially extending flexible arms mounted on said collar, said arms having a tip portion that dips into said reservoir upon rotation of said shaft, some of said arms having a blade portion spaced from said tips to circulate air in one direction, the other of said arms having a blade portion spaced from said tip to circulate air in the opposite direction, whereby upon rotation of said shaft said arms lift lubricant out of said reservoir to form a lubricant mist in said housing and blow the lubricant mist in opposite directions to lubricate said bearings.

References Cited in the file of this patent

UNITED STATES PATENTS

| | | |
|---|---|---|
| 427,575 | Huber | May 13, 1890 |
| 1,467,686 | Reynolds | Sept. 11, 1923 |
| 1,769,736 | Fieux | July 1, 1930 |
| 2,242,262 | Ray | May 20, 1941 |
| 2,379,944 | Willmot | July 10, 1945 |

FOREIGN PATENTS

| | | |
|---|---|---|
| 760,817 | Great Britain | Nov. 7, 1956 |
| 1,143,962 | France | Apr. 15, 1957 |

(Corresponding English language patent: Great Britain, 814,446, June 3, 1959)